United States Patent [19]

Hope et al.

[11] Patent Number: 4,888,206

[45] Date of Patent: Dec. 19, 1989

[54] METHOD AND APPARATUS FOR COATING A SUBSTRATE WITH ALKALINE OR ALKALINE EARTH METALS

[76] Inventors: Henry F. Hope; Stephen F. Hope, both c/o Hope Industries, Inc., 5701 Moreland Rd., Willow Grove, Pa. 19090

[21] Appl. No.: 198,440

[22] Filed: May 25, 1988

[51] Int. Cl.$^4$ .............................................. B05D 1/02
[52] U.S. Cl. ...................................... 427/57; 427/123; 427/422; 118/302
[58] Field of Search ......................... 427/123, 423, 57; 118/302, 325; 239/4, 82, 102.2

[56] References Cited

U.S. PATENT DOCUMENTS

| | | | |
|---|---|---|---|
| 3,347,698 | 10/1967 | Inghan | 427/57 |
| 4,224,356 | 9/1980 | Singer | 427/422 X |
| 4,311,275 | 1/1982 | Lindkvist | 239/102.2 |
| 4,552,091 | 11/1985 | Feder | 118/308 |

FOREIGN PATENT DOCUMENTS 63-14848  1/1988  Japan ................................. 427/422

Primary Examiner—Shrive Beck
Attorney, Agent, or Firm—Z. T. Wobensmith, III

[57] ABSTRACT

A method and apparatus for coating a substrate with alkaline or alkaline earth metals is disclosed. The apparatus includes a reservoir to contain a melt of the metal, means for breaking the melt into fine droplets, and means for advancing a substrate having a surface to be coated along a path past the means for breaking the melt into fine droplets which contact the surface and provide a coating of the desired thickness. The apparatus coats the substrate in a pure inert gas environment. Use of the above apparatus provides a method for coating an alkaline or an alkaline earth metal onto a substrate to be realized.

11 Claims, 2 Drawing Sheets

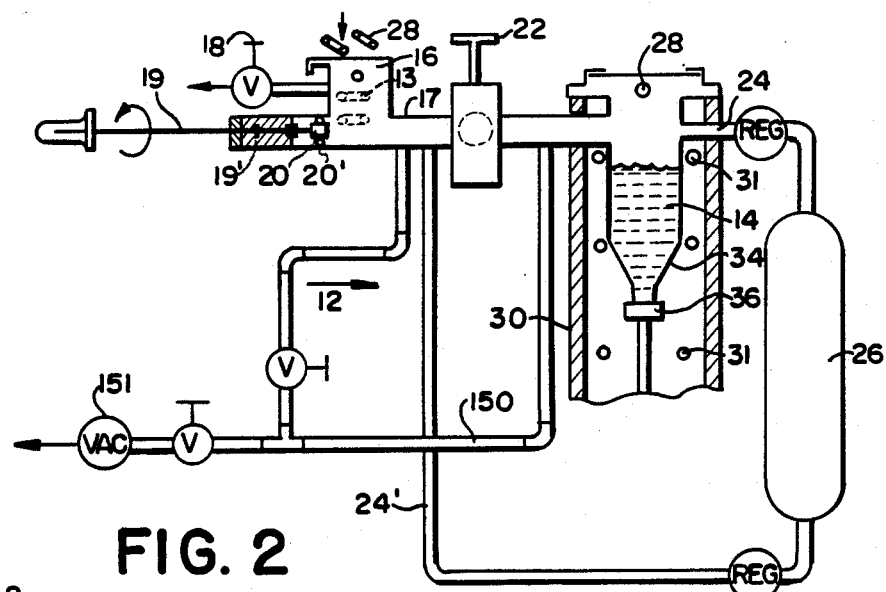
FIG. 2
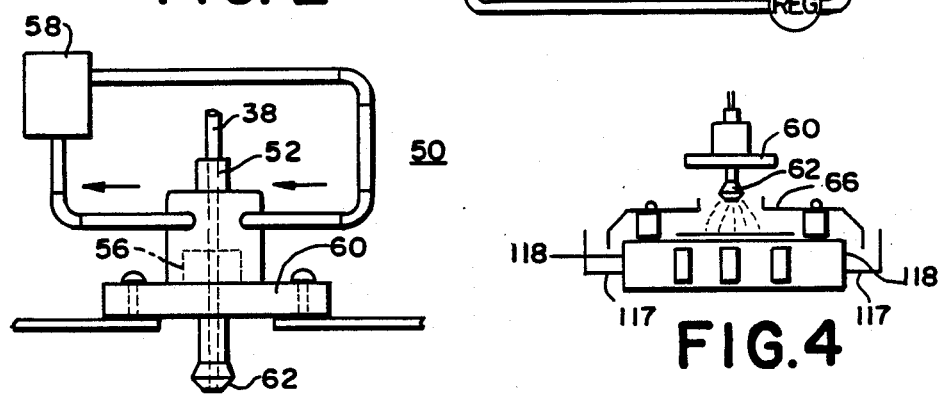
FIG. 3
FIG. 4
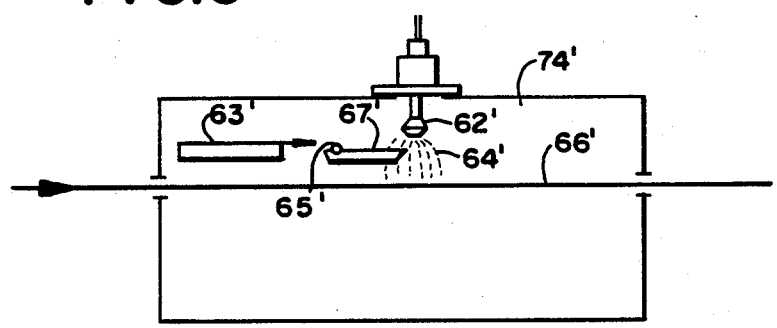
FIG. 5

METHOD AND APPARATUS FOR COATING A SUBSTRATE WITH ALKALINE OR ALKALINE EARTH METALS

BACKGROUND OF THE INVENTION

1. Field of the Invention

This invention relates to a process for coating a substrate with alkaline or alkaline earth metals and more particularly lithium.

2. Description of the Prior Art

Presently, there is a high level of interest in industry in designing thin layer lithium batteries. Such batteries typically include a lithium anode, a transition metal oxide-polymer composite as a cathode, and an electrolyte which may be a solid or a liquid and which includes a dissolved lithium salt.

A principal objective of the designers of these batteries, particlarly in applications in wihch large electrode areas are needed, is to make them as thin as possible while satisfying market needs in terms of capacitance, current density, shelf-life and the like.

While methods for making lithium anodes are known, these methods typically provide an anode containing much more lithium than is necessary to meet the electrochemical requirements of the cell. As a consequence, lithium is wasted, the battery is more expensive, and the battery is substantially thicker and heavier than necessary. For example, the most common method for fabricating lithium anodes is cold rolling of lithium metal onto a substrate, however it is difficult to roll lithium metal into strips thinner than about 50 microns. U.S. Pat. No. 3,721,113, describes a method for alleviating this difficulty by rolling the lithium between smooth polymeric surfaces having sufficiently low critical surface energy to prevent adhesion, however, this method is limited to thicknesses of not less than about 40 microns.

Alkaline and alkaline earth metals are highly reactive metals, such metals and particlarly lithium react violently with moisture, are easily contaminated and require special handling.

A further difficultly involved with producing lithium coated substrates for later incorporation into batteries is that the surface of the lithium metal is subject to contamination which must be removed prior to forming into a battery, requiring special handling and expense.

Other methods for coating a substrate with lithium are known in the art as illustrated by U.S. Pat. No. 3,551,184 to Dremann, et al., which involves rubbing a heated substrate with a rod of lithium metal, and U.S. Pat. No. 3,928,681 wherein metal substrates are coated as they are conveyed through an alkali metal melt. Each of these methods has drawbacks which would make it difficult to implement in an industrial setting and neither provides a solution to the problems that result when the coatings are much thicker than required in a lithium cell. Additionally such composite structures are subject to delamination.

Methods for spray coating metals are known in the art as illustrated by U.S. Pat. Nos. 3,845,901 and 4,311,275, but none of them solves the problems associated with the use of alkaline and alkaline earth metals and particularly with lithium.

SUMMARY OF THE INVENTION

The invention provides a method and apparatus for providing a coating on a substrate of lithium or another alkaline or alkaline earth metal, which coating is of a controlled thickness and preferably less than 30 microns. More particularly, the invention provides a method and apparatus for forming lithium or other alkaline or alkaline earth metal anodes for use in electrochemical cells, wherein a current collector, such as nickel or copper foil is coated by using a fine mist of alkaline or alkaline earth metal droplets.

While the discussion hereafter will refer to ltihium it will be apparent that other alkaline or alkaline earth metals can be deposited in an analogous manner. Similarly, while the discussion hereafter will make reference to coating metal foil substrates for use as anodes in lithium cells, the method can be used to provide a lithium coating on substantially any type of substrate on which a lithium coating would be desired.

In accordance with the invention a melt of lithium is fed to a coating head where the melt is broken up into fine droplets, and discharged to contact the surface to be coated and form a layer thereon. The surface to be coated is preferably pre-heated to a temperature above the melting point of the lithium (or other metal) so that the lithium droplets fuse on the surface of the substrate and form a thin film. Due to the high reactivity of lithium, the method is conducted in a non-reactive environment, and preferably in a pressurized controlled atmosphere of inert gas.

In accordance with one embodiment of the invention, the lithium melt is fed to a coating head from a reservoir positioned above the coating head, and the pressure with which the lithium is fed to the coating head is controlled by the height of the lithium reservoir, and suitable valving. The lithium is typically conveyed from the reservoir to the coating head through vertical non-corrosive tubing, such as titanium tubing, which is heated to prevent the lithium from solidifying in the course of the coating operation. The coating thickness is monitored using conventional thickness monitoring equipment and controlled by the rate with which the substrate traverses the coating head.

After coating the coated substrate is cooled. It is considered desirable to coat the substrate with lithium in one chamber and to cool it with circulating cooled inert gas in a second chamber, separated from the coating chamber, so that the circulating gas does not affect the coating mist and produce undesirable surface characteristics.

It has also been found desirable to provide a means for classifying the melt droplets generated at the coating head, so that larger droplets, which might result in excess thickness or undesirable surface characteristics are not deposited on the surface and are removed. One method for droplet control is to pass the mist through a stream of inert gas which diverts the acceptable droplets so that they are deposited on the surface and so that the non-acceptable droplets fall into a collection tray and are returned for melting and reuse.

Accordingly, one manifestation of the invention is a method for coating a substrate with an alkaline or an alkaline earth metal, in a pressurized controlled atmosphere of inert gas, which comprises:

forming a melt of said metal;
breaking said melt into fine droplets;
contacting the surface of a substrate to be coated with said fine droplets so as to form a coating of said metal on said surface; and
cooling the coated substrate.

Another manifestation of the invention is an apparatus for coating a substrate with an alkaline or an alkaline earth metal which apparatus contains a pressurized controlled atmosphere of inert gas and which comprises:

a reservoir for a melt of said metal;

means for breaking said melt into fine droplets;

means for feeding said melt to said means for breaking said melt into fine droplets;

means for advancing a substrate having a surface to be coated along a path past said means for breaking said melt into fine droplets such that said droplets contact said surface, and means for cooling said coated substrate.

BRIEF DESCRIPTION OF THE DRAWINGS

The nature and characteristic features of the invention will be more readily understood from the following description taken in connection with the accompanying drawings forming part hereof in which:

FIG. 2 is an enlarged view of the lithium feed device portion of the apparatus shown in FIG. 1, and FIG. 3 is an enlarged view of the coating head portion of the apparatus shown in FIG. 1, FIG. 4 is a vertical sectional view, enlarged, taken approximately on the line 4—4 of FIG. 1 of a portion of the apparatus shown in FIG. 1, and FIG. 5 is an alternate embodiment of a portion of the apparatus of the invention wherein a tray and jet stream are used to remove and recover droplets which are of incorrect size.

Figure 1:
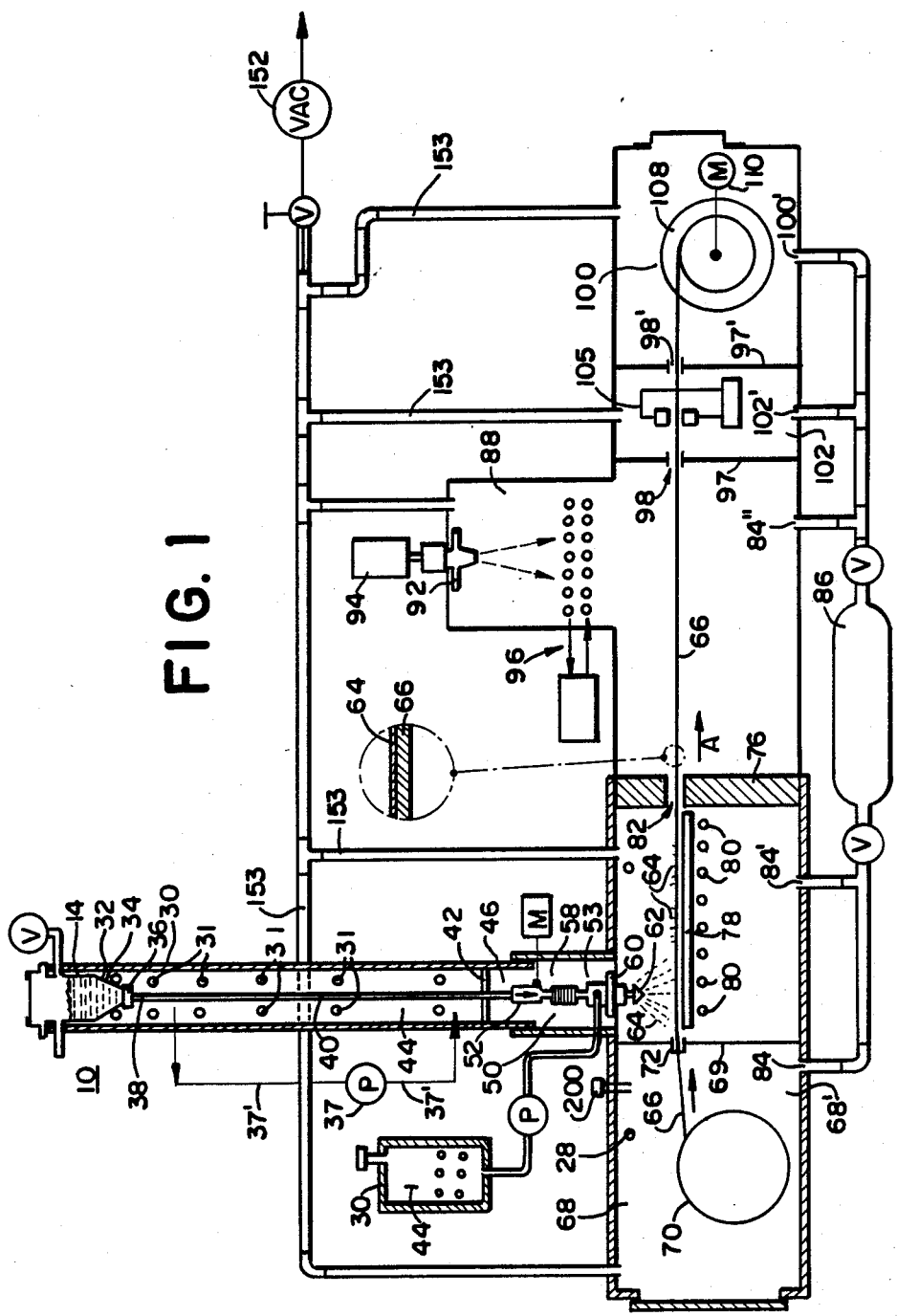
FIG. 1 is a schematic diagram of the apparatus constructed in accordance with the invention.

It should, of course, be understood that the description and drawings herein are illustrative merely and that various modifications and changes can be made in the structures disclosed without departing from the spirit of the invention.

DETAILED DESCRIPTION OF THE PREFERRED EMBODIMENTS

When referring to the preferred embodiments certain terminology will be utilized for the sake of clarity. Use of such terminology is intended to encompass not only the described embodiment, but also all technical equivalents which operate and function in substantially the same way to bring about the same result.

Referring now to the drawings, and more particularly to FIGS. 1, 2 and 3 the apparatus of the invention is designated as 10. Apparatus 10 includes a lithium feed device 12, with a reservoir 14, which is located on and inside an insulated, heated column 30.

In FIG. 2, the lithium feed device 12 is shown in greater detail. The reservoir 14 receives solid lithium pellets 13 from chamber 16, which are loaded into the chamber through lid 15. Chamber 16 has a purge valve 18 connected to it and a piston 20 is carried in chamber 16. Piston 20 is of well known type and can be connected to a threaded shaft 19, which is rotated to advance piston 20 to transport pellets 13 from chamber 16 to reservoir 14. Piston 20 is provided with an O-ring seal 20' and shaft 19 has an O-ring seal 19' in contact therewith for sealing chamber 16. Chamber 16 has a line 17 connected thereto and to reservoir 14 through ball valve 22 for delivery of pellets 13 from chamber 16 to reservoir 14. The chamber 16 and reservoir 14 must be free from moisture and other contaminants which are purged through valve 18 and lines 150 which are connected to a vacuum pump 151. The contaminants are replaced by an inert gas atmosphere, such as argon supplied from tank 26 through lines 24 and 24', to line 17, chamber 16 and reservoir 14.

Heat is provided to column 30 by oil, such as silicone oil, carried in the interior 44 which is heated by submerged heating coils 31.

The column 30 is also provided with a circulating pump 37 and lines 37' to cause the hot oil in interior 44 to be continually circulated to maintain the entire tube 38 at the desired temperature.

In order to monitor the temperature in column 30, temperature probes 40 are located along tube 38, which connects reservoir 14 to a coating head assembly 50. In addition oxygen and nitrogen sensors 20 are located throughout the apparatus to monitor and detect the presence of oxygen, nitrogen or moisture inside of the apparatus.

In FIG. 1, it is seen that the lower portion of the reservoir 14 is located inside of column 30. The lower portion of reservoir 14 extends through tapered sections 32 to form a neck 34, which is connected by coupling 36 to tube 38 through valve 52 to coating head assembly 50. Coating head assembly 50 includes a flow control valve 52, a coil 53, mounting block 60, a piezoelectric vibratory element 56, and nozzle 54.

The coil 53 is connected by lines 53' and 53" to a source of fluid 58 which can be heated or cooled to the desired temperature to maintain the piezoelectric element 56 at the desired operating temperature consistent with the melting point of the metal to be sprayed.

The column 30 has an interior 44, which is closed off at the bottom by a plate 42 which also carries tube 38. The column 30 has an attaching collar 48 connecting it to coating chamber 74.

The collar 48 which surrounds the coating head assembly 50 and valve 52 above the nozzle 54 provides an interior 58 which is connected to a source of hot gas (not shown) to cause the melt in tube 38 to remain in the molten state. The chamber 74 has a table 78 therein which is heated to maintain the substrate 66 at a temperature slightly above the melting point of the alkaline or alkaline earth metal to be deposited. The substrate 66 is on a roll 70 in feeding chamber 68 and is preferably a metal foil of nickel, copper or other metal that does not react unfavorably with the material to be deposited thereon and which enters chamber 74 through opening 72 in dividing wall 69. The substrate 66 is pre heated in chamber 68 by heating elements 68' and is carried in a horizontal direction on table 78 and exits chamber 74 through opening 82 into cooling chamber 88.

Also included in chamber 88 is a fan 92 which is driven by a motor 94. Chamber 88 also contains cooling element 96 of well known type. The end of chamber 88 opposite walls 76 contains walls 97 having an opening 98.

Connected to chamber 88 via walls 97 and opening 98 is measuring chamber 102 with a take up chamber 100 connected to it by opening 98' in wall 97'. Take-up roll 108 which is powered by motor 110 is located in chamber 100. The substrate 66 is thus pulled through the coating apparatus by motor 110.

The chambers 68, 74, 88, 100 and 102 are purged of contaminants through vacuum pump 152 connected to the chambers by lines 153 and inert gas can then be supplied to chambers 68, 74, 88, 100 and 102 from gas container 86 by openings 84, 84', 84", 100' and 102'.

As is seen more clearly in FIG. 4 the table 78 is provided with a mask 115 which extends above the substrate 66 with a top plate 116 which has a central opening 117 and which is mounted on the top of table 78. Gutters 117 are provided on each side of mask 115 to capture and remove the overspray from the nozzle 54 which flows over the sides 118 of top plate 116. The mask 115 ensures that a border is provided so that only the desired portion of the substrate 66 is coated, and the sprayed metal does not flow out over and under the substrate 66 when it is in the coating chamber 74.

To provide a coating on a substrate such as a metal foil with lithium or another alkaline or alkaline earth metal having a controlled thickness, by using the apparatus, the following procedure is performed. First, solid metal pellets 13 such as lithium, usually in cylindrical form are deposited in chamber 16 through lid 15. As it is imperative that the entire apparatus be mositure free, air is purged from chamber 16 through valve 18 and is replaced by an inert, moisture free gas from supply tank 26 through line 24. Once the system has a sufficiently low moisture, oxygen and nitrogen content, valve 22 is opened and shaft 19 is rotated to advance piston 20 to displace the metal pellets through line 17, and feed them into reservoir 14. Reservoir 14 is heated to above the melting point of the alkaline or alkaline earth metal, preferably by use of a heating liquid such as silicone oil with heating coils 31 submerged therein to cause the content of the lithium in reservoir 14 to be melted.

The melted lithium then flows from neck 34 to tube 38 and through tube 38, while in a molten state, until it reaches coating head assembly 50. Heat is provided to column 30, for example, by heating coils 31 containing silicone oil, to ensure that the temperature of the tube 38 remains above the melting point of the alkaline or alkaline earth metal. It is also preferred that the walls of column 30 are insulated. By use of the tube 38, the feed of molten lithium from reservoir 14 to coating head 50 is primarily effectuated through gravitational forces. Further, the height of tube 38 is designed to create a suitable pressure for feeding the melted lithium to the coating head assembly 50. Valve 52 is adjusted to control the amount of lithium fed to the coating head 50 as required.

Once in coating head assembly 50, the melted lithium is broken into fine misted droplets by use of the vibratory effect of piezoelectric vibratory element 56. It is important that the lithium droplets to be deposited on the substrate be in a fine or misted condition. A preferred droplet size for batteries is less than 20 microns. Droplet forming chamber 46 remains heated above the melting point of the alkaline or alkaline earth metal to ensure that it remains in melted form. However, piezolelectric vibratory element 56, which typically takes the form of a crystal, is temperature sensitive, and must be cooled. Accordingly, element 56 is brought to the desired temperature, which is above the melting point of the melt to be sprayed, by utilization of temperature stabilizing system 58, which pumps controlled temperature oil around the elements of the coating head assembly.

The fine droplets created by element 56 exit through coating head outlet 62 in a fine mist as is represented by element 64, and the fine droplets fall onto substrate 66, which originated from feed roll 70 in substrate feed chamber 68 and was horizontally advanced through opening 72 until its surface was located directly below outlet 62, in coating chamber 74. Prior to use the substrate must be appropriately prepared by removing contaminants and materials that may react with the alkaline or alkaline earth metal to be coated onto the substrate. Substrate 66 is heated in chambers 68 and 74 so that its temperature is above the melting point of lithium metal. This enables the fine lithium droplets to fuse onto the surface of the substrate and form a thin liquid film coating on its upper surface.

The coating head is operated so as to provide a spray of lithium droplets in size of less than 20 microns. This is accomplished by proper flow adjustment, and energy adjustment of the head 50.

Substrate 66 moves through chamber 74 in the direction indicated by arrow A into cooling chamber 88. Chambers 66 and 88 are separated by highly efficient insulating walls 76 to ensure that the heat generated in chamber 74 does not enter chamber 88, and conversely, that the cooled gas contained in chamber 88 does not enter chamber 74 in any appreciable amount. The cooling of substrate 66 and coating 64 in chamber 88 causes the lithium mist on substrate 66 to solidify. Cooling is effectuated by cooling element 96 and recirculation of the cooled gas, preferably argon, through fan 92 which is driven by motor 94.

Once a solid layer of lithium has formed on substrate 66, substrate 66 is advanced through opening 98 into measuring chamber 102. At this stage in the process, the thickness of the lithium coating on the metal foil may be measured by measuring sensors 105, such as laser measuring sensors of well known type which are connected to control the motor 110 and the flow valve 52. The rate with which the substrate is pulled through the coating chamber and/or the rate with which lithium is supplied to the coating head is adjusted by the sensors 105 in response to the measured thickness to produce the desired coating thickness.

Motor 110 acts to enable substrate 66 to traverse through the various chambers at the desired rate of speed.

In the preferred embodiment of the invention, reservoir 14 is made of a material which does not react with lithium, and is preferably a titanium vessel. It is envisioned within the scope of the invention that other materials may be used, with the proviso that they do not react with lithium or any other materials to be melted.

In the preferred embodiment of the invention, column 30 is heated by silicone liquid which has heating coils 31 submerged therein. It is envisioned that other means for heating column 30 may be practiced within the scope of the invention, with the proviso that the heating means must be able to maintain the metal in a melted condition.

In the preferred embodiment of the invention, vertical tube 38 is made of a material which does not react with the coating metal and enables the coating metal to be maintained in a melted condition. The prefered material of choice is titanium, although other materials which do not react with the coating metal may be used.

In the preferred embodiment of the invention, the vibrating element utilized to break the melted alkaline or alkaline earth metal into fine droplets is a piezolectric crystal. Additionally, other elements may be chosen with the proviso that the element must be able to break the melt into fine droplets.

In the preferred embodiment of the invention the substrate is a metal foil, and in particular, either a nickel or copper foil, or other suitable substrate materials as desired.

In the preferred embodiment of the invention the apparatus contains an oxygen, hydrogen and moisture free, pure inert gas environment, such as argon gas. It is envisioned that other inert gaseous environments may be used.

In some applications, it is particularly desirable for lithium to be deposited onto a substrate in the form of a fine mist. When droplets are expelled through the coating head outlet, sometimes not all of the droplets are small enough to constitute a fine mist. Accordingly, an alternate embodiment, for ensuring that only a fine mist is deposited onto the substrate is described below.

Referring to FIG. 5, an alternate coating chamber 74' is shown. Chamber 74' includes coating head outlet 62' which expels droplets of lithium. The droplets expelled from the head of outlet 62' are contacted with a jet stream of hot pure inert gas represented by element number 63'. The droplets which are unacceptable in size (i.e., too large to be deposited onto the substrate) are represented by element 65', are collected in tray 67', while particles which are suitable for coating, as represented by element 64', are deposited onto substrate 66'. The use of jet stream 63' and tray 67' classifies the droplets emitted from outlet 62' such that only droplets emitted from outlet 62' of the proper size are deposited on substrate 66' and preferentially diverts the mist 64' away from tray 67' and onto substrate 60'. The droplets which are trapped in tray 67' are recirculated to the coating head for use.

By utilizing the described apparatus, when the coating material is lithium and when the substrate is a metal foil, the resultant product is suitable for use as an anode of a lithium battery. The process is particularly advantageous because it is easily controlled to produce lithium coatings of desired thickness.

Having described the invention in detail and by reference to preferred embodiments thereof, it will be apparent that modifications and variations are possible without departing from the scope of the appended claims.

We claim:

1. A method for coating a substrate with an alkaline metal or an alkaline earth metal in a controlled inert atmosphere which comprises:
   forming a melt of said metal,
   breaking said melt into fine droplets,
   contacting the surface of a substrate to be coated with said fine droplets so as to form a coating of said metal on said surface, and
   cooling said coated substrate.

2. The method of claim 1 wherein said metal is lithium.

3. The method of claim 1 wherein said substrate is heated to facilitate the formation of said coating.

4. The method of claim 1 wherein said step of breaking said melt into fine droplets includes feeding said melt to a means for subjecting said melt to vibration.

5. The method of claim 4 wherein said means for subjecting said melt to vibration is positioned above said surface to be coated and said step of contacting said surface includes allowing said droplets to fall upon said surface.

6. The method of claim 5 wherein said step of feeding said melt includes the step of providing a reservoir of molten metal above said means for breaking said melt into fine droplets, and conveying said melt to said means for breaking said melt through an essentially vertical tube such that a gravity feed is established between said reservoir and said means for breaking said melt.

7. The method of claim 6 wherein said tube includes control means to control said gravity flow.

8. The method of claim 5 wherein said substrate is heated to a temperature greater than the melting point of said melt.

9. The method of claim 1 wherein said fine droplets form a mist.

10. The method of claim 1 wherein said method includes the additional steps of classifying said droplets into droplets having an acceptable size and droplets larger than said acceptable size, and collecting said larger droplets such that said larger droplets do not contact said substrate.

11. The method of claim 10 wherein said classification of said droplets includes an inert gas stream and the collection of said larger droplets whereby said inert gas stream impinges all of said droplets and preferentially divers said acceptable droplets from collection and deposits them on said substrate.

* * * * *